(12) United States Patent
Paulsen

(10) Patent No.: US 9,465,859 B2
(45) Date of Patent: *Oct. 11, 2016

(54) COMPUTER-IMPLEMENTED METHOD OF ARRANGING TEXT ITEMS IN A PREDEFINED ORDER

(71) Applicant: GN Netcom A/S, Ballerup (DK)

(72) Inventor: Christian Paulsen, Dyssegard (DK)

(73) Assignee: GN Netcom A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,094

(22) Filed: Jun. 9, 2015

(65) Prior Publication Data

US 2015/0269249 A1    Sep. 24, 2015

Related U.S. Application Data

(63) Continuation of application No. 13/523,062, filed on Jun. 14, 2012, now Pat. No. 9,052,844.

(30) Foreign Application Priority Data

Jun. 16, 2011  (EP) ..................... 11170120

(51) Int. Cl.
G06F 7/00      (2006.01)
G06F 17/30     (2006.01)
G06F 7/08      (2006.01)

(52) U.S. Cl.
CPC ........... *G06F 17/30613* (2013.01); *G06F 7/08* (2013.01)

(58) Field of Classification Search
CPC .................. G06F 17/30312; G06F 17/30613; G06F 7/08
See application file for complete search history.

(56) References Cited

U.S. PATENT DOCUMENTS

| | | |
|---|---|---|
| 4,611,280 A | 9/1986 | Linderman |
| 4,939,639 A | 7/1990 | Lee et al. |
| 5,072,386 A | 12/1991 | Garneau et al. |
| 5,148,541 A | 9/1992 | Lee et al. |
| 6,510,436 B1 | 1/2003 | Hart |
| 7,568,156 B1 | 7/2009 | Fischer et al. |
| 7,587,378 B2 | 9/2009 | Van Meurs |
| 8,712,989 B2 | 4/2014 | Wei et al. |

(Continued)

FOREIGN PATENT DOCUMENTS

JP    2010076735    4/2010

OTHER PUBLICATIONS

Mark Davis et al. "Unicode Technical Standard #10—Unicode Collation Algorithm", Aug. 8, 2010, pp. 1-49, XP55020614, retrieved from the Internet on Feb. 29, 2012: url:http://www.unicode.org/reports/tr10/tr10-22.html.

*Primary Examiner* — Marc Somers
(74) *Attorney, Agent, or Firm* — Altera Law Group, LLC

(57) ABSTRACT

A computer-implemented method of and a device, such as a base station for a headset, for arranging text items in a predefined order, comprising storing, in the memory of a peripheral device, a collection of multiple text items arranged in multiple sets of text items and in multiple groups of text items; storing a respective code item with a respective group of text items; and storing a sort key that has values that designate a predefined order of the text items in each set. The sort key is appended to the text items and comprises at least one character with a value within the Private Use range of the Unicode format.

10 Claims, 2 Drawing Sheets

(56) References Cited

U.S. PATENT DOCUMENTS

| | | |
|---|---|---|
| 2005/0091035 A1 | 4/2005 | Kaplan et al. |
| 2005/0177358 A1 | 8/2005 | Melomed et al. |
| 2005/0251519 A1 | 11/2005 | Davis |
| 2006/0104276 A1 | 5/2006 | Naick et al. |
| 2006/0168130 A1 | 7/2006 | Cox |
| 2008/0046824 A1 | 2/2008 | Li et al. |

COMPUTER-IMPLEMENTED METHOD OF ARRANGING TEXT ITEMS IN A PREDEFINED ORDER

Devices, such as for example base stations for headsets, are often provided with a microprocessor or microcontroller capable of serving their main purpose such as establishing communication between a personal computer and a headset.

Such devices and other devices with a microprocessor or microcontroller dedicated to a particular purpose are typically specifically configured to that purpose and lack the processing resources in terms of CPU rate and memory space of e.g. a general purpose computer when it comes to processing resources allocated to functions of the device aside the particular purpose of the device. Thus, for instance for serving a user interface or man-machine-interface of the device there are relatively limited processing resources available.

To this end it is often desired to provide an as intuitive and comprehendible user interface as possible. This may involve providing instructions and selectable options in a selectable language which in turn takes processing resources for text processing e.g. for presenting words and names in alphabetic order. Presenting selectable text options in alphabetic order greatly improves the intuitiveness of the user interface.

Especially, sorting of text items in alphabetical order is a complex task when several language are dealt with because the device needs to comply with national or language-wise sorting rules which governs e.g. how words with national characters such as 'æ', 'ø' and 'å' in the Danish alphabet are to be dealt with.

Thus, in order to improve the user interface, more advanced text processing and/or sorting capabilities are needed at the lowest possible cost in terms of CPU rate and memory space.

RELATED PRIOR ART

US 2008/0046824 A1 discloses a method for sorting two or more contact persons held in a contact name data repository of a mobile device such as a mobile phone. A sort component can sort the contacts according to a so-called display name reading which is based on the pronunciation of the display name in question so as to provide an intuitive sorting of the two or more contact persons. The method can operate on language letters, characters, numbers and phonetic symbols as long as the computer/mobile device can recognize the letters, characters. The sort component can employ a suitable encoding system or tool for sorting of the contact names for example based on Japanese Unicode characters.

U.S. Pat. No. 7,587,378 B2 discloses handheld computing devices such as wireless phones and PDAs that include a display to present human-readable information. A rule data store contains a statement of rules governing prescribed aspects of presenting data on the display. A set of rules are used to manage the display of language variable data. The set of rules may possess knowledge about specific features of for example Dutch such as the rule that the "ij" character comes before the "j" character in alphabetic order in Dutch. A rules engine returns the language variable data appropriately alphabetically sorted to a calling program. The disclosed alphabetic sorting methodologies and devices are based on normal Unicode mapping.

SUMMARY

There is provided a computer-implemented method of arranging text items in a predefined order, comprising storing, in the memory of a peripheral device, a collection of multiple text items arranged in multiple sets of text items and in multiple groups of text items; and storing a respective code item with a respective group of text items. Further comprising storing a sort key that has values that designate a predefined order of the text items in each set; wherein the sort key is appended to the text items and comprises at least one character with a value within the Private Use range of the Unicode format.

This is expedient especially for peripheral devices with limited data storage capacity and limited data processing capacity. The sort key can be used to store the text items in a way where they are readily available for being sorted by a relatively simple sort algorithm to present them in a sorted order which otherwise would require a relatively complex sort algorithm. The sort key and its values can be appended to the text items by a pre-processing step that may require a relatively complex sort algorithm and thus strong computational power to bring the text items into a desired order, e.g. alphabetic order, as designated by the values of the sort key. Such a pre-processing step may be performed by a general purpose computer such as a personal computer running an operating system such as Microsoft Windows™ and using the sort programs available therein. Also as a part of the pre-processing step, the sort key and its values are appended to the text items. The result of the pre-processing step can be in the form of a binary file that is downloaded to the memory of the peripheral device.

Subsequent to the pre-processing step, the peripheral device can access its memory and run the relatively simple sort algorithm with its relatively limited computational power to present the text items in the order defined by the relatively complex sort algorithm.

The text items comprise characters conforming to the Unicode standard used in most computer systems. The values of the sort key are encoded to comprise values taken from the so-called Private Use Area of the Unicode standard. The Private Use Area of the Unicode standard comprises values in the hexadecimal range U+E000 to U+F8FF. The values of the sort key are assigned such that they designate a desired sort order by ascending or descending values. The values may be consecutive values. It is the values of the sort key that designate the sort order. The sort key may comprise a single Unicode character or any multitude of Unicode characters. Likewise, the text items may each comprise one or any multitude of Unicode characters.

In an embodiment, a peripheral device has a simple man-machine interface with a small display and a few buttons and requires a country dependent set-up, where a user is requested to enter his country of location and is presented on a display with a list of countries in his own language of preference. According to the above method it is then possible to present to the user the list of countries, in a selected language, in an alphabetic order which may be different from the order in which the text items are stored. This greatly improves interaction with the user, since the user has the items presented in an order he/she would expect; an alphabetic order. Thereby, the interaction with the user can proceed in a faster way than that otherwise possible given the computational power and memory resources of the peripheral device. It should be noted however, that other sort orders than an alphabetic sort order can be used.

The code item can comprise any country and/or language dependent information that can be read by the peripheral device to make it operate according to a property given by the code item. In an embodiment the code item comprises country codes and/or telephone numbers for directing a telephone call or a text message according to the Short Message Service to a desired country and/or subscriber. The telephone call and/or text message may be performed and/or initiated automatically or semi-automatically from the peripheral device. Since telephone calls and text messages are charged by fees that generally are higher when they are destined for other countries it is thus convenient to use a local/national subscriber line for instance for product registration services or other services, such as for registering the peripheral device. The above-mentioned method makes it possible to select nationality for instance for this purpose in a convenient way, where country names can be sorted as a user would expect them to be sorted. This greatly improves the quality of the man-machine-interface of the device.

In some embodiments the peripheral device is a base station for a headset that connects the headset to a general purpose computer. The base station may comprise a radio frequency transmitter/receiver for wireless communication with the headset and connects to the general purpose computer by a wired connection e.g. a Universal Serial Bus (USB) connection or a wireless connection e.g. a Bluetooth™ connection. The computer-implemented method is executed as a programme run by a microprocessor or microcontroller or Application Specific Integrated Circuit, ASIC, or any other device that is programmable by hardware and/or software.

In some embodiments the method comprises sorting the text items of a predefined set according to the sort key to arrange them in the predefined order and provide a predefined number thereof for displaying in a sorted order.

In an embodiment this step is performed by the peripheral device some point in time subsequent to the pre-processing step e.g. during country dependent configuration of the peripheral device. Since the sort key with values indicating the sort order of the text items is appended when they are stored in the peripheral device, the peripheral device can access its memory and run the relatively simple sort algorithm with its relatively limited computational power to present the text items in the order defined by the relatively complex sort algorithm. The text items can thus be stored in some order that saves memory consumption of the entire collection of text items. This order may be different from the sort order. Meanwhile the text items can be presented by the peripheral device in a sorted order according to e.g. a selected language or location.

In some embodiments the method comprises displaying a predefined number of the text items from the selected set of text items for a user to select a text item there from; and deciding which text item that was selected and looking up the code item assigned to the group.

In some embodiments the man-machine-interface of the peripheral device is relatively limited and the display thereof may offer only a few lines of text display. It is therefore advantageous to display only a predefined number of text items out of all the text items in a selected set at a time. Other text items can then be displayed by a scroll and select technique known in the art. With such a technique a user can select a text item which relates to a code item that in turn can be read by the peripheral device to make it operate according to a property given by the code item.

In an embodiment the sort key is ignored by the display means such that the text items are displayed, but the values of the sort key is not given any graphical rendering by the display. Alternatively, the sort key can be removed before the text items are displayed. Still alternatively, the values of the sort key are given the same graphical rendering and/or a rendering by a symbol which is a class of characters different from the characters of the text items; it may also be rendered as a 'space' or any other character.

In some embodiments the method comprises selecting at least one of the sets of text items in response to a user selection.

In an embodiment this step is performed during configuration of the peripheral device e.g. to provide text items in a language the user can read and understand. Configuration of the peripheral device can take place the first time it is put into operation or when initiated through a user interface. The user may then be provided with the option of selecting a language. Alternatively, configuration may take place as a step of manufacturing the device where a language is selected to correspond with the device' shipping destination.

In some embodiments the sort key is appended to the text items as a leading or trailing character to constitute a text item that comprises characters within the Private Use Range and in the range not comprised by the Private Use range.

Thereby, when the sort key is appended as a leading and/or trailing character, a simple and easy way to access the sort key is provided. Since in many cases the display means does not render the characters within the Private Use Range, display of the text in the text items is not distorted. Otherwise it is a simple operation to discard the appended trailing or leading characters before displaying.

In some embodiments the text items are arranged in a table structure with columns, rows and cells, wherein a set is arranged in a column of the table, a group is arranged in a row and the cells of the table comprise the text items.

In some embodiments the table is stored in a binary file or other memory means for random access memory storage. As mentioned above the sort key may be appended to the text items in the table as a leading or trailing character.

In some embodiments the table, which is a first table, is stored in a data memory which is a section of memory where data are stored mainly for read operations. The table may comprise a group key that relates a group of text items to a related code item which is stored in a second table. The second table may then be stored in a programme memory where the programme executing the method is stored. Consequently, the first table can be updated and/or loaded into memory without altering the content of the second table and the programme. This is expedient to secure a reliable way of maintaining the programme and the memory of the peripheral device.

In some embodiments the multiple collections of text items comprise country names in a respective language, wherein a group comprises the name of a country in different languages and wherein a set comprises names of multiple countries, in one language.

This configuration is expedient for a configuration procedure that requires a national set-up e.g. in connection with use of automatic or semi-automatic dial-in procedures or text message exchanges over public telephone connections to/with servers.

In some embodiments the method comprises the following steps of providing the collection of multiple text items: loading into a programme running on a computer a list of text items; sorting the list alphabetically using the programme and receiving from the programme a sorted list with the text items in alphabetic order; appending the sort key to the text items in the sorted list in a way to designate the alphabetic order; and providing the sorted list with the sort key for storing as a set of the collection of text items in the memory of the peripheral device.

These steps can take place during manufacture of the peripheral device. Consequently, the peripheral device does not need processing resources to run a sorting algorithm that takes national sorting rules into account. The computer may be a general purpose computer running the Microsoft Windows™ operating system or any other operating system.

In some embodiments multiple lists of names of countries are loaded into the programme in order to sort each list alphabetically. The sort key is stored with the text items such that the alphabetic order of the text items of each set can be revealed e.g. by appending the sort key as a leading or trailing character of each text item and assigning sort key values in increasing or decreasing order.

There is also provided a device comprising: a memory having stored therein a collection of multiple text items arranged in multiple sets of text items and in multiple groups of text items; and for a respective group of text items, a respective code item. Wherein the memory stores a sort key that has values that designate a predefined order of the text items in each set; and wherein the sort key is appended to the text items and comprises at least one character with a value within the Private Use range of the Unicode format.

DETAILED DESCRIPTION

Figure 1:
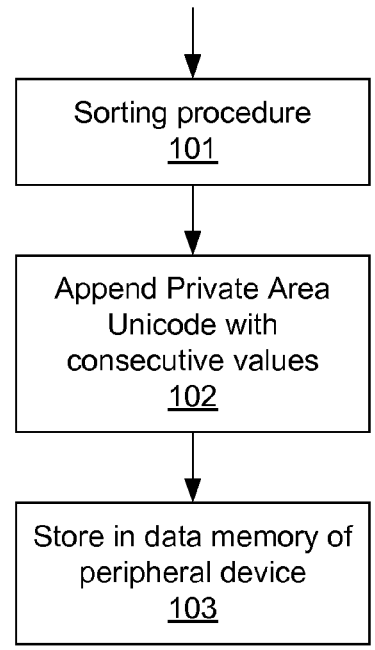
FIG. 1 shows a flowchart for a method of appending a sort key according to the Private Use range of the Unicode format.

FIG. 1 shows a flowchart for a method of appending a sort key according to the Private Use range of the Unicode format. The method is executed by a computer and comprises a first step 101 of running a sorting procedure. The input to the sorting procedure is multiple lists of text items forming a collection of text items. The lists of text items are sorted individually and in some embodiments according to different sorting rules. The objective of running the sorting procedure is to be able to apply a sort key to each text item that indicates the sorted order of the text items within each list. The sort key is applied in step 102. The sort key is appended to the text items e.g. as a leading or trailing character and comprises at least one character with a value within the Private Use range of the Unicode format.

Subsequently, in step 103, the collection of text items with their sort key is stored in the memory of a peripheral device. In some embodiments these steps are performed by equipment for manufacturing a peripheral device and takes place during manufacture of the peripheral device.

In table 1 below, is shown a data structure for storing text items according to the Unicode format, which is used by most, if not all, conventional computer systems.

The sort key is represented by the square-shaped symbol '☐' and represents one or more characters according to the Private Use range of the Unicode format, whereas the capital letters A-Z and letters a-z represents characters according to the non-private range of the Unicode format. In an embodiment table 1 or a similar data structure is stored in the memory of a peripheral device e.g. in a data memory thereof.

TABLE 1

|  | English | Danish |
| --- | --- | --- |
| AU | ☐Australia | ☐Australien |
| AT | ☐Austria | ☐Østrig |
| CN | ☐China | ☐Kina |
| ... | ... | ... |

In this case the text items represent country names, but could as well represent other text items. The text items are arranged in multiple sets of text items and in multiple groups of text items, where the second and third column comprises a first set and a second set, respectively. The second, third, fourth and succeeding rows comprises a first, second, third group of text items. Thus various country names stated in e.g. the English language are comprised in a set of text items and a country name stated in various languages is comprised by a group of text items.

The text items in the second column are arranged in alphabetic order as defined by at least some English speaking countries. These text items are related to a group key which is stated e.g. as AU for Australia. In order not to store this group key in a redundant way the text items of e.g. the third and succeeding columns are stored in an order different from the alphabetic order. However, the alphabetic order is represented by the value of the sort key. Applying the Danish alphabetic order, the value of the sort key could be '1' for Australia, '2' for China and '3' for Austria. Therefore, the sorting procedure run in step 101 is run for the purpose of appending a sort key value which indicates a desired order. This order is not necessarily the order in which the text items are stored as shown in table 1.

Table 2 below shows as an example the text items for the language option 'Danish' in sorted order as they may appear in a display of a device such as a base station for a headset. The text items are sorted according to the value of the sort key. The text items are relatively easy to sort since the sorting is based on the sort key which is pre-appended. Since this order correspond to the alphabetic order as defined for Danish language it is intuitive for a person knowing the Danish language to browse and select a particular country or any other text item in Danish or any other predefined language. Especially, when the list comprises more than three text items it greatly improves the man-machine-interface of a device when text items can be found in e.g. alphabetic order. Also, when the list is comprises three or more text items e.g. 10 text items and only a subset e.g. 3 or 5 and thereby not all text items are available for display at the same time it greatly improves the man-machine-interface

TABLE 2

| ☐Australien |
| --- |
| ☐Kina |
| ☐Østrig |

Table 3 below shows a data structure which may be embedded in a programme and stored in a programme memory. The leftmost column serves as the group key to relate rows of table 3 to rows in table 1, wherein the leftmost column serves as a key for that relation. The rightmost column and any further columns can comprise a code item which is selected via a selection of a text item made by a user from a selected column of table 1. Thus, if a user selects Danish as a desired language the country names listed in the rightmost column of table 1 is displayed. A selection of e.g. 'King' makes it possible to firstly retrieve the key value 'ON' and then with that value looking up table 3 in the programme memory to get the code item '+86' which is used as a property in the programme run by the peripheral device.

TABLE 3

| AU | +64 |
|----|-----|
| AT | +43 |
| CN | +86 |

In some embodiments the code item comprises multiple code items and/or references to other code items. The code item may represent a pre-dial number for selecting a country or region when making a telephone call. Additionally or alternatively, the code item may comprise a complete telephone number.

In some embodiments other data structures tables are used for storing the text items and the code items. As an alternative to two tables, one or three and more tables can be used. Nested lists may be such an alternative data structure.

The Private Use Area of the Unicode standard comprises values in the hexadecimal range U+E000 to U+F8FF. This range of values is available for the text items within a single set of text items and can be reused for each set. Appending two or more characters expands the number of text items that can be assigned a unique sort key value and thus the number of text items that can be handled in a sorted way.

Figure 2:
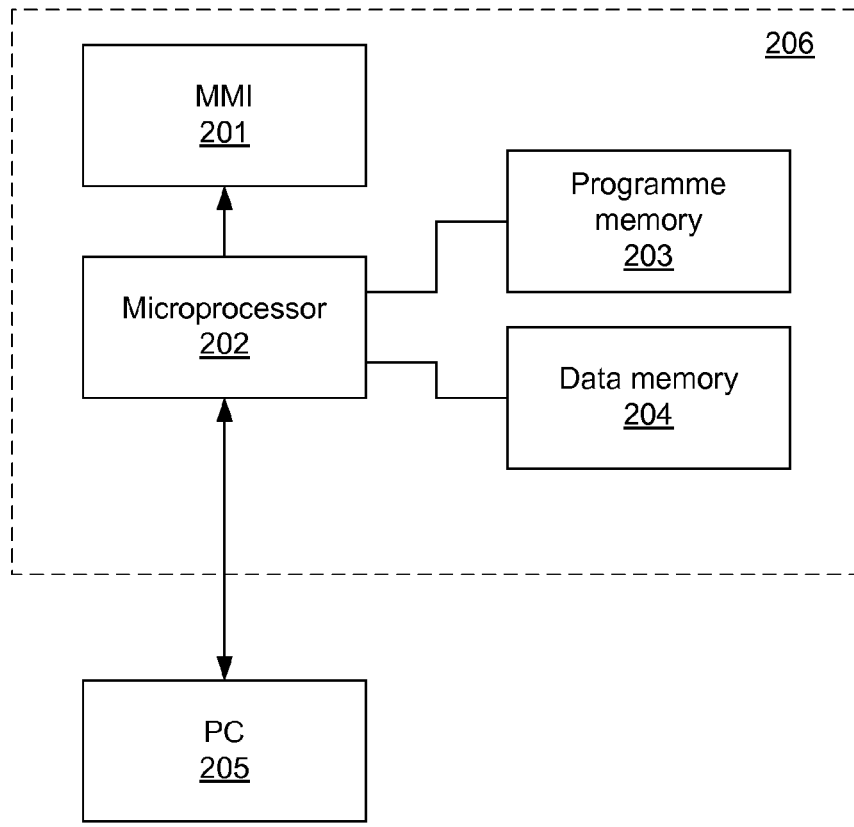
FIG. 2 shows a block diagram of a peripheral device.

FIG. 2 shows a block diagram of a peripheral device. The peripheral device 206 is connected to a computer 205 which may be a general purpose or personal computer or another type of computer loaded with a programme to store a data structure as mentioned above in the memory of the peripheral device 206 during manufacture of the device. During normal operation of the device it is also connected to a personal computer or another type of computer e.g. via a USB connection.

The peripheral device comprises a microprocessor 202 with a programme memory 203 and a data memory 204. The data memory stores the text items e.g. as mentioned in connection with table 1 and the programme memory stores the code items e.g. as mentioned in connection with table 2. Additionally, the peripheral device comprises a man-machine-interface 201 with a display (not shown) and buttons (not shown) for displaying a predefined number of the text items e.g. on 3 or 5 lines at a time and for providing a user with the option of selecting one of the text items which in turn enables a programme run by the microprocessor 202 to reed a code item related to the text item and continue programme execution with the read code item. In some embodiments, the continued programme execution may involve invoking or calling or communicating with a programme running on the computer 205.

Figure 3:
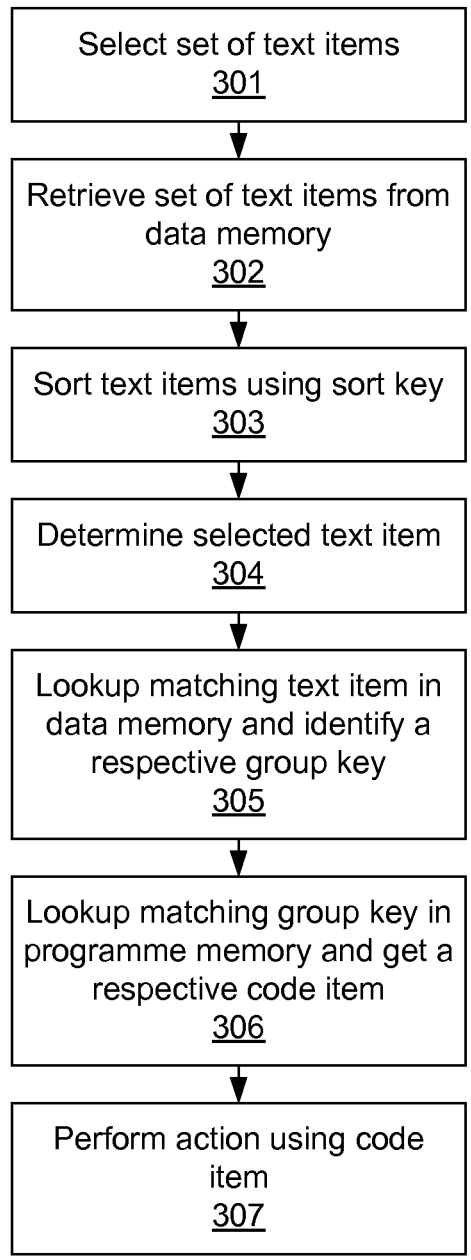
FIG. 3 shows a flowchart for a method run by the peripheral device.

FIG. 3 shows a flowchart for a method run by the peripheral device. In a first step 301 of the method, a set of text items is selected. As mentioned above, selecting a set of text items can be selecting a language in which it is preferred to have various country names listed. In a following step, 302, the selected set of text items are retrieved e.g. from a data structure as illustrated by table 1. At this stage of executing the method, the sort key is available and indicates by its value for each text item the order in which they are to be displayed or otherwise presented. It is thus a computationally feasible task for the device to sort the text items using the sort key in step 303. For instance if, as illustrated by table 1, the Danish language is selected the storage order does not correspond to the order in which they are to be displayed and sorting is necessary.

By means of a man-machine-interface a user is provided, in step 304, with the option of selecting a country e.g. from the list exemplified by table 2 and it is determined which text item and thus country the user has selected. Subsequently, in step 305, the determined text item is used to look up a matching text item, in the selected language, in a table structure as illustrated by table 1 to identify a respective group key value. Thus, looking up the text item can be confined to a single column of the table. Then, in step 306, a group key value matching the one found in table 1 is looked up in table 3 and a respective code item can be read.

In step 307 continued programme execution with the read code item is carried out. In this way it is possible to provide an improved user interface which demands only limited processing resources.

Generally, the term 'computer-implemented method' is used to designate that the method runs on any type of processor such as a microcontroller or microprocessor or other type of integrated circuit.

The invention claimed is:

1. A computer-implemented method of arranging text items in a predefined order, comprising:
   loading into a program running on a computer a list of text items;
   storing, in the memory of a peripheral device, a collection of multiple text items arranged in multiple sets of text items and in multiple groups of text items; and
   storing a respective code item with a respective group of text items;
   storing a sort key that has values that designate a predefined order of the text items in each set;
   wherein the sort key is appended to the text items and comprises at least one character with a value within the Private Use range of the Unicode format
   sorting a resultant list according to a predetermined sort order using the program and receiving from the program a sorted list with the text items in said sort order;
   appending the sort key to the text items in the sorted list in a way to designate said sort order; and
   providing the sorted list with the sort key for storing as a set of the collection of text items in the memory of the peripheral device
   providing the collection of multiple text items:
   sorting the list alphabetically using the program and receiving from the program a sorted list with the text items in alphabetic order;
   appending the sort key to the text items in the sorted list in a way to designate the alphabetic order; and
   providing the sorted list with the sort key for storing as a set of the collection of text items in the memory of the peripheral device.

2. A computer-implemented method according to claim 1, comprising:
   sorting the text items of a predefined set according to the sort key to arrange them in the predefined order and provide a predefined number thereof for displaying in a sorted order.

3. A computer-implemented method according to claim 1, comprising:
   selecting at least one of the sets of text items in response to a user selection.

4. A computer-implemented method according to claim 3, comprising:
   displaying a predefined number of the text items from the selected set of text items for a user to select a text item there from;

deciding which text item that was selected and looking up the code item assigned to the group.

5. A computer-implemented method according to claim 1, wherein the sort key is appended to the text items as a leading or trailing character to constitute a text item that comprises characters within the Private Use Range and in the range not comprised by the Private Use range.

6. A computer-implemented method according to claim 1, wherein the text items are arranged in a table structure with columns, rows and cells, wherein a set is arranged in a column of the table, a group is arranged in a row and the cells of the table comprises the text items.

7. A computer-implemented method of arranging text items in a predefined order, comprising:
- loading into a program running on a computer a list of text items;
- storing, in the memory of a peripheral device, a collection of multiple text items arranged in multiple sets of text items and in multiple groups of text items; and
- storing a respective code item with a respective group of text items;
  - storing a sort key that has values that designate a predefined order of the text items in each set;
  - wherein the sort key is appended to the text items and comprises at least one character with a value within the Private Use range of the Unicode format
  - sorting a resultant list according to a predetermined sort order using the program and receiving from the program a sorted list with the text items in said sort order;
  - appending the sort key to the text items in the sorted list in a way to designate said sort order; and
- providing the sorted list with the sort key for storing as a set of the collection of text items in the memory of the peripheral device; wherein the multiple collections of text items comprises country names in a respective language, wherein a group comprises the name of a country in different languages and wherein a set comprises names of multiple countries, in one language.

8. A device according to claim 7, wherein the sort key is appended to the text items as a leading or trailing character to constitute a text item that comprises characters within the Private Use Range and in the range not comprised by the Private Use range.

9. A device according to claim 7, wherein the text items are arranged in a table structure with columns, rows and cells, wherein a set is arranged in a column of the table, a group is arranged in a row and the cells of the table comprises the text items.

10. A peripheral device comprising:
- a memory having stored therein a collection of multiple text items arranged in multiple sets of text items and in multiple groups of text items; and for a respective group of text items, a respective code item;
- the memory stores a sort key that has values that designate a predefined order of the text items in each set; wherein the sort key is appended to the text items and comprises at least one character with a value within the Private Use range of the Unicode format and wherein the sort key is appended to the text items as a leading or trailing character to constitute a text item;
- wherein the multiple collections of text items comprises country names in a respective language, wherein a group comprises the name of a country in different languages and wherein a set comprises names of multiple countries, in one language.

\* \* \* \* \*